April 6, 1943. O. MUELLER 2,315,643
MEANS FOR SECURING CROSS MEMBERS TO FRAMES
Filed Nov. 7, 1938
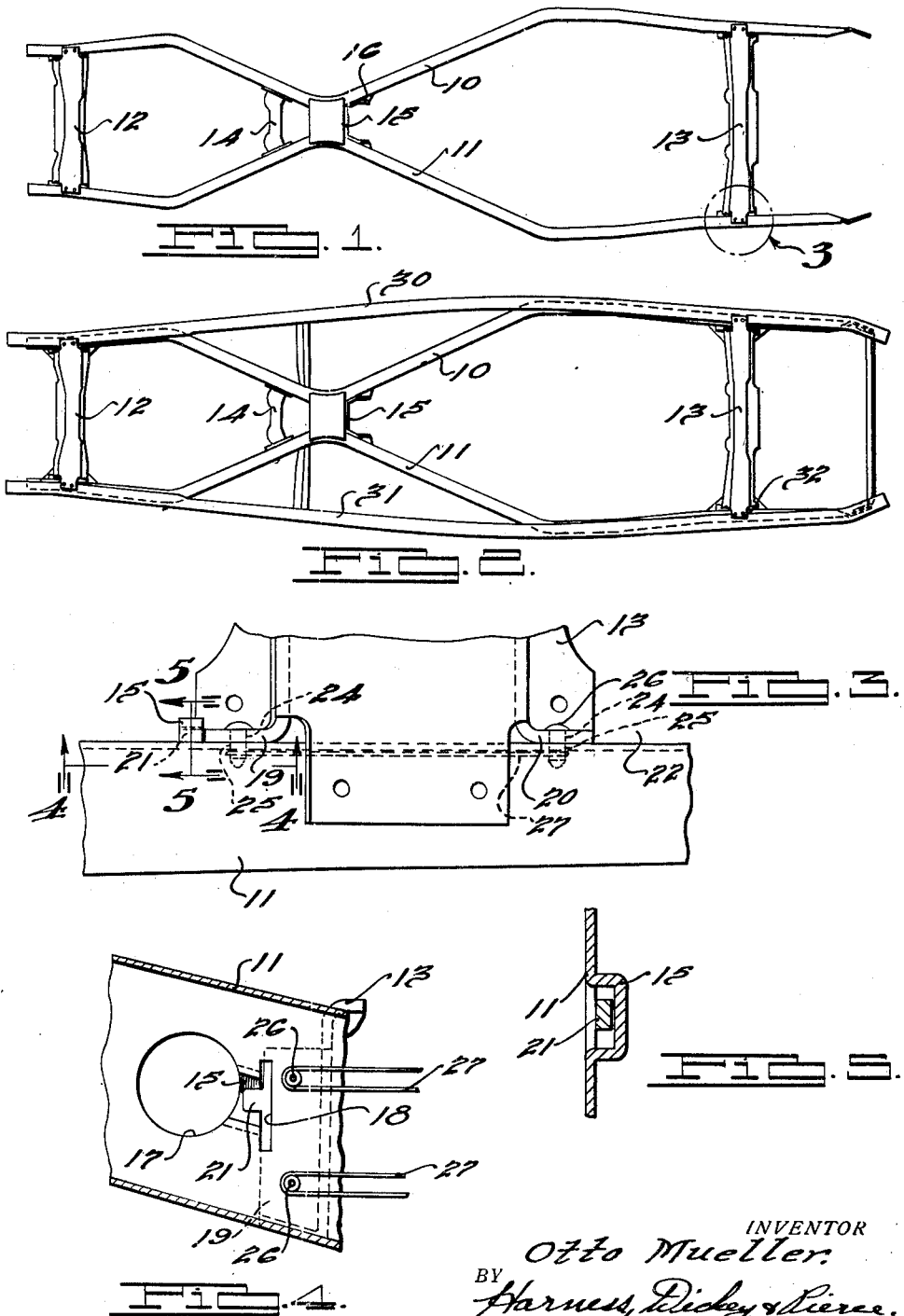

Patented Apr. 6, 1943

2,315,643

UNITED STATES PATENT OFFICE 2,315,643

MEANS FOR SECURING CROSS MEMBERS TO FRAMES

Otto Mueller, Dearborn, Mich., assignor to The Murray Corporation of America, Detroit, Mich., a corporation of Delaware Application November 7, 1938, Serial No. 239,333

5 Claims. (Cl. 281—106)

The invention relates generally to motor vehicles and it has particular relation to the chassis frame of such vehicles.

Ordinarily, the chassis frame of a motor vehicle includes spaced side members extending longitudinally of the vehicle and a plurality of cross-members connecting the side members. These are initially formed with rivet openings and in the application of the present invention, it is desirable to assemble the members in properly related positions and then transport or convey the assembly to an automatic riveting machine. Considering the fact that the frames are heavy, it will be appreciated that retaining the parts properly assembled prior to any setting of the rivets requires positive and strong connecting or retaining means or else the members will separate or become improperly positioned in a relative sense and if this occurs, considerable delay is incurred in order to again bring the members into proper relative positions at the riveting machine. It is thus desirable to provide a simple and efficient means for and method of connecting the members together during transporting or conveying of the assembly to a riveting machine so as to avoid delay and interference in the manufacturing operations.

One object of the invention is to provide a simple means for preventing displacement of the side frame members relative to the cross member while handling the assembly and advancing it to the riveting machine.

Another object of the invention is to provide improved means for the above mentioned purpose, which is of such character that it is rendered effective by moving the cross-members longitudinally relative to the side members.

Another object of the invention is to provide a method of handling and assembling side and cross-members of a vehicle frame, which enables a quick assembly of such members in their approximately proper relation and the holding of such members in such relation before permanently connecting the members.

Other objects of the invention will become apparent from the following specification, from the drawing to which it relates, and from the claims hereinafter set forth.

For a better understanding of the invention, reference may be had to the drawing, wherein:

Figure 1 is a plan view of an assembled vehicle frame embodying holding means constructed according to one form of the invention.

Fig. 2 is a view similar to Fig. 1, but illustrating in addition, other frame members that are provided in the finished frame structure;

Fig. 3 is an enlarged view of the connection shown in the circle indicated by the letter A in Fig. 1;

Fig. 4 is a cross-sectional view taken substantially along the line 4—4 of Fig. 3; and Fig. 5 is a cross-sectional view taken substantially along the line 5—5 of Fig. 3.

Referring to Figure 1, the assembly shown includes principally, longitudinally extending side members 10 and 11, a front cross-member 12, and a rear cross-member 13. The side members 10 and 11 converge substantially at the center and may be joined there by an additional cross-member 14, a plate 15, and a bracket support 16. Initially, each of the frame members is formed with rivet receiving openings and then the members are brought into approximately proper relation where unset rivets are to be inserted in the laterally directed openings.

Now directing attention to Figs. 3, 4, and 5, each side member has a struck-out loop or strap 15 which is of channel shape and this strap jointly with the side surface of the frame member forms a rectangular slot or keeper. It will be observed in connection with Fig. 4 that the keeper is formed next to an opening 17 in the frame member and that a slot 18 of suffiicent length is also provided at the opposite side of the strap, from which it follows that the strap may be pressed out of the frame member without undue difficulty.

At each of its ends, the cross-member 13 has front and rear flanges 19 and 20 adapted to rest against the side frame member and the front flange 19 has a forwardly projecting tongue 21 which is adapted to enter the keeper on the side member. In its proper position, the ends of the cross-member also rest on shelf portions 22 projecting inwardly from the side members. Openings 24 formed in the flanges 18 and 19 are aligned laterally with openings 25 formed in the side frame member when the parts are in proper relation and unset rivets 26 having their preformed heads at the inner side of the side member are inserted in such openings. These rivets may be sufficiently held against loosely falling out of the openings by using rubber bands, for example, that are stretched around the non-headed ends of the rivets, as indicated at 27, and which increase the frictional contact between the rivets and the sides of the openings.

Both ends of each cross frame member are in this manner associated with the side members and it becomes apparent that the tongues and keepers prevent lateral separation of the side members relative to the cross members and that the unset rivets 26 prevent longitudinal separation of the members. While the rivets are not as yet set, they are easily retained in the openings by the friction provided even though the assembly is picked up and handled rather roughly.

It may be stated at this time that the cross-members may easily and rapidly be assembled with the side members in this fashion as it is only necessary to space the side members and move the cross-members longitudinally thereof until the keepers and tongues are properly engaged and then to insert the laterally disposed rivets and apply the rubber bands thereto. Then the assembly may be conveyed to the riveting machine and manipulated as a unit as may be required until the rivets are set.

Directing attention to Fig. 2, additional side members 30 and 31 may thereafter be added and riveted to the cross-members and side-members 10 and 11 by vertical rivets 32. Such additional side members 30 and 31 have been illustrated because these members, in conjunction with the structure illustrated by Fig. 1, ordinarily are considered as comprising the complete chassis frame.

The invention is of considerable importance in that it enables assembling the frame members in proper relation and handling of the assembly as a unit until it is riveted. When it is considered that the frame members are heavy and that an assembly thereof is not easily held together by manual effort alone, it may be appreciated that the invention will allow more rapid manipulation of such assemblies since each becomes a unit which may be manipulated as such. Moreover, the unit may be moved directly to the riveting machine and it is not necessary either to make any disconnections or to insert the rivets to be set.

Although only one form of the invention has been illustrated and described in detail, it will be apparent to those skilled in the art that various modifications may be made without departing from the scope of the appended claims.

What is claimed is:

1. A motor vehicle chassis frame assembly comprising longitudinally extending side members, a cross frame member near each end of said side members, a keeper and tongue connection between each end of the cross members and the adjacent side members and rivets to be swaged arranged to hold the keeper and tongue connection against separation before swaging and the chassis members together after swaging.

2. A motor vehicle chassis frame assembly comprising longitudinally extending side members, a cross frame member near each end of said members, a keeper on each side frame member, tongues on the ends of the cross member projecting into the keepers, and rivets for locking said members against separation before being swaged, which rivets, after a swaging operation, hold the chassis members together.

3. A motor vehicle chassis frame assembly comprising longitudinally extending side members, a cross frame member near each end of said members, a projection on each side member forming a keeper which is open longitudinally of the side member, tongues on opposite ends of the cross members and projecting into the keepers, and rivets for maintaining said members together before and after a swaging operation.

4. A motor vehicle chassis frame assembly, comprising longitudinally extending side members, a cross frame member near each end of the side members, a struck out keeper on each side member open longitudinally thereof, tongues on the ends of the cross member projecting into the keepers, said keepers and tongues being arranged for interengagement by moving the cross members longitudinally of the side members, and rivets for maintaining the members together before and after a swaging operation.

5. A motor vehicle chassis frame assembly comprising longitudinally extending side members, a cross frame member near each end of said side members having the ends thereof in abutting relation to side faces of said side members, a projection on the side faces of each side member adjacent the end of each cross member, said projections being recessed to form a keeper which is opened longitudinally of the side member, tongues on each end of and at right angles to the cross members and projecting into the keeper to prevent side movement of said side members relative to said cross members, and rivets passing through holes extending through said side and cross members in a direction longitudinally of said cross members for preventing side movement of said cross members relative to said side members and thereby maintaining said tongue and keeper in engagement.

OTTO MUELLER.